(12) United States Patent
Rothkop

(10) Patent No.: US 6,914,521 B2
(45) Date of Patent: Jul. 5, 2005

(54) VISUAL DISPLAY FOR VEHICLE

(75) Inventor: Jaron Rothkop, Royal Oak, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/394,128

(22) Filed: Mar. 21, 2003

(65) Prior Publication Data

US 2004/0090317 A1 May 13, 2004

Related U.S. Application Data

(60) Provisional application No. 60/372,539, filed on Apr. 12, 2002.

(51) Int. Cl.$^7$ ............................................ B60Q 1/00
(52) U.S. Cl. .................... 340/425.5; 340/903; 340/435; 340/436; 701/301; 180/169
(58) Field of Search ................................ 340/435, 436, 340/438, 903, 904, 909, 943; 701/300, 301, 41; 180/167, 168, 169; 342/70, 71

(56) References Cited

U.S. PATENT DOCUMENTS

| | | |
|---|---|---|
| 5,339,075 A | 8/1994 | Abst et al. |
| 5,463,384 A | 10/1995 | Juds |
| 5,517,196 A | 5/1996 | Pakett et al. |
| 5,598,164 A | 1/1997 | Reppas et al. |
| 5,734,336 A | 3/1998 | Smithline |
| 5,765,116 A | 6/1998 | Wilson-Jones et al. |
| 5,767,793 A | 6/1998 | Agravante et al. |
| 5,786,772 A | 7/1998 | Schofield et al. |
| 5,929,786 A | 7/1999 | Schofield et al. |
| 5,940,011 A | 8/1999 | Agravante et al. |
| 6,091,321 A | 7/2000 | Karell |
| 6,097,285 A | 8/2000 | Curtin |
| 6,211,778 B1 | 4/2001 | Reeves |
| 6,232,910 B1 | 5/2001 | Bell et al. |
| 6,268,803 B1 | 7/2001 | Gunderson et al. |
| 6,618,672 B2 * | 9/2003 | Sasaki et al. ................ 701/301 |
| 6,744,353 B2 * | 6/2004 | Sjonell ........................ 340/435 |

* cited by examiner

*Primary Examiner*—Daryl C Pope
(74) *Attorney, Agent, or Firm*—MacMillan, Sobanski & Todd, LLC

(57) ABSTRACT

The visual display system of the present invention includes a visual indicator having at least first and second light emitters. A controller is connected to the visual indicator. The system further includes a device for detecting a vehicular condition and is capable of transmitting a signal to the controller in response to the vehicular condition. The controller is operable to actuate the first light emitter at a first lighting characteristic and the second light emitter at a second lighting characteristic different from the first lighting characteristic in response to the signal.

12 Claims, 2 Drawing Sheets

VISUAL DISPLAY FOR VEHICLE

CROSS REFERENCE TO RELATED APPLICATIONS

This application claims the benefit of U.S. Provisional Application No. 60/372,539 filed Apr. 12, 2002.

BACKGROUND OF THE INVENTION

The present invention relates in generally to safety devices for vehicles. Most modern vehicles are equipped with various safety equipment to alert the driver of vehicular conditions and impending hazards. For example, some vehicles include warning lights or buzzers for alerting the driver of vehicle conditions such as low fuel, abnormal engine temperature, oil pressure, tire pressure, and abnormal readings from the vehicle's electrical charging system. The warning lights typically include a single light source which lights an indicator corresponding to the particular vehicle condition. Typically, these lights emit a single light source and are simply activated "on" to indicated a problem, or "off" to indicate that the condition is normal. The lights do not convey information of the severity of the problem causing the alert.

Another safety device which has been introduced in recent years is a proximity or blind spot detection system. The detection system warns the driver of the vehicle that another vehicle is in close proximity, such as in the "blind spot", when the driver wishes to change lanes. The blind spot is generally defined as the region to the sides and/or rear of the vehicle in which the driver may not be able to view the proximate vehicle in the rear and side view mirrors. By monitoring the actuation of the turn signal or steering of the vehicle, the driver's wish or inclination to turn the vehicle can be anticipated. The system includes sensors for detecting the presence of a vehicle in relatively close proximity to the driver's vehicle. The system also includes a warning light or buzzer which alerts the driver when the presence of the vehicle is detected. These buzzers or lights are simply activated from on "off" mode to an "on" mode, and do not convey any other information regarding the proximity the other vehicle.

BRIEF SUMMARY OF THE INVENTION

The present invention relates in generally to safety devices for vehicles, and in particular to a visual method of delivering external sensor data to the driver in a manner which minimizes distraction and communicates external or internal vehicular conditions and relative safety.

The visual display system of the present invention includes a visual indicator having at least first and second light emitters. A controller is connected to the visual indicator. The system further includes a device for detecting a vehicular condition and is capable of transmitting a signal to the controller in response to the vehicular condition. The controller is operable to actuate the first light emitter at a first lighting characteristic and the second light emitter at a second lighting characteristic different from the first lighting characteristic in response to the signal.

Various objects and advantages of this invention will become apparent to those skilled in the art from the following detailed description of the preferred embodiment, when read in light of the accompanying drawings.

DETAILED DESCRIPTION OF THE INVENTION

Figure 1:
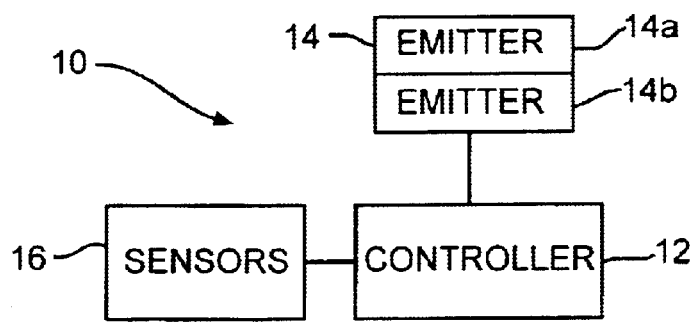
FIG. 1 is a schematic diagram of a visual display system, in accordance with the present invention.

Referring now to the drawings, there is illustrated in FIG. 1 a schematic representation of a visual display system, indicated generally at 10, in accordance with the present invention. The display system 10 relates in generally to a visual method of delivering external sensor data to the driver in a manner which helps minimize distraction and communicates various internal or external vehicular conditions. In general, the system 10 includes a controller 12, a visual indicator assembly 14, and one or more devices or sensors 16. A suitable controller 12 would be a microprocessor which is connected to the sensor 16 receiving signals therefrom. The sensor 16 can be any suitable sensor device which detects a desired vehicular condition. Examples of detectable vehicular conditions include proximity detection, such as blind spot detection, impact detection, lane changing detection, reverse sensing, right angle sensing. Other examples include vehicle performance indicators such as temperature indication, engine and drive train readings, and HVAC controls. Also, the activation and/or control of telematic devices, such as cell phones, data modules, RF and satellite radios, navigation equipment (GPS), directional equipment, or distance-to-target equipment, could also be detectable vehicular conditions. Thus, the sensor 16 detects the operational state of an electronic device. The sensor 16 can be any suitable device which can detect a vehicular condition and send a signal to the controller 12 corresponding to the condition. The controller 12 can be any suitable device which can receive the signal from the sensor 16 and transmit a command signal to the visual indicator assembly 14 to actuate the assembly 14 in a manner corresponding to the severity of the condition, as will be discussed in greater detail below. The controller 16 could be integrated into either of the sensor 16 and visual indicator assembly 14. Thus, upon detection of a condition, the sensor 16 sends a signal to the visual indicator assembly 16 for alerting the driver to the condition.

Preferably, the visual indicator assembly 14 is mounted on the vehicle within the view field of the driver. The visual indicator assembly 14 can be any suitable light emitting device which displays information to visually alert the viewer, driver, or other occupant of the vehicle. Preferably, the assembly 14 includes at least two emitters 14a and 14b, and more preferably a plurality of light emitters, which are independently controlled by the controller 12. With at least two emitters, the visual indicator assembly 14 can display more information than a conventional single on/off light emitter. Thus, more information regarding the detected condition can be conveyed to the driver. The two emitters can be activated by the controller 12 such that a first emitter 14a is actuated at a first lighting characteristic, and the second emitter 14a is actuated at a second lighting characteristic different from the first lighting characteristic. By detecting at least two different lighting characteristics, the additional information regarding the condition can be transmitted to the driver. The additional information may convey the severity or immediacy of the condition. Examples of lighting characteristics include different colors, light intensities, frequency rate of blinking, different blinking patters, the number or emitters lit. For example, if the condition is deemed severe, one color, such as red, could be displayed, and if the condition is deemed less sever another color, such as green, could be displayed. Alternatively, a high frequency of blinking could be associated with a more severe or immediate condition. If the visual indicator assembly 14 included a plurality of emitters, a higher number of activated emitters could represent a more severe condition. It should also be understood that any combination of different lighting characteristics could be used to alert the viewer. For example, different colors and blinking rates may be used together. Also, other indicators, such as audible and tactile devices could be used in cooperation with the visual indicator assembly 14 to alert the driver or viewer.

The visual indicator assembly 14 can use any suitable light emitting source for its light display, such as for example, incandescent bulbs, light emitting diodes (LEDs), electro-luminescent (EL) panels or strips, neon or other gaseous bulbs, and/or liquid crystal displays (LCD). The light emitting source could also be a multi-colored LED, wherein the multi-colored LED would represent two or more light emitters corresponding to the number of different colors the LED is capable of emitting.

Figure 2:
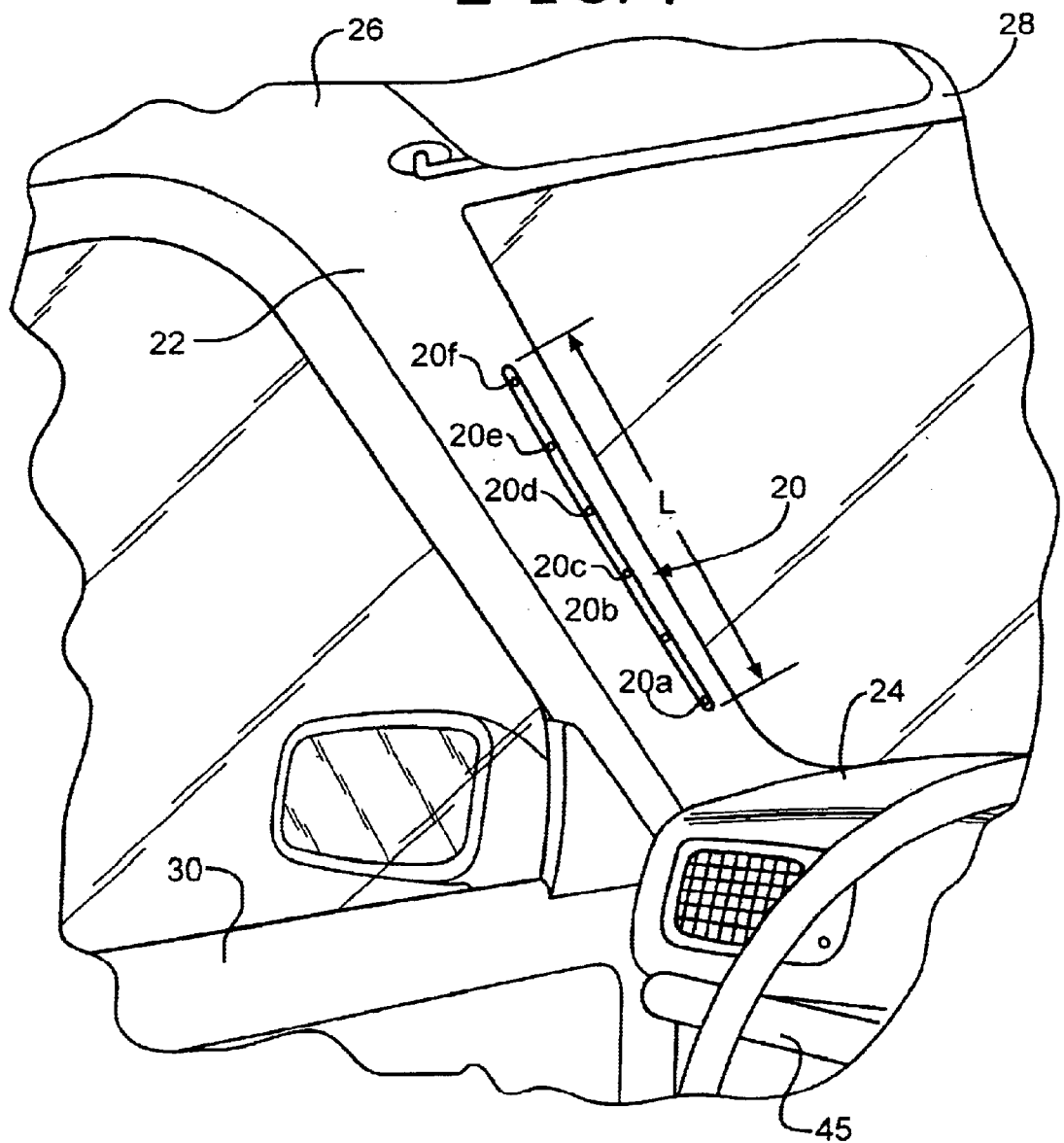
FIG. 2 is a perspective view of a portion of a vehicle in which a preferred embodiment of a visual indicator assembly of the display system is mounted.

There is illustrated in FIG. 2, an embodiment of visual indicator assembly, indicated generally at 20, which may be used for the assembly 14 described above. The assembly 20 is mounted within an A-pillar trim panel 22 covering the A-pillar of the vehicle. The A-pillar is a structural portion of the frame of the vehicle which extends generally vertical about a slope, and extends from a front corner of an instrument panel 24 upwards to a front corner 26 of a roof 28. The A-pillar is in front of a door 30.

The assembly 20 is shown mounted on the left or driver side A-pillar trim panel 22, but it should be understood that the assembly 20 could be mounted on the right or passenger side A-pillar. Alternatively, both left and right A-pillar trim panels 20 can include a visual indicator, such as the assembly 20. It should also be understood that the visual indicator assembly, such as the assembly 14, 20 or any other assembly referred to herein can be positioned at any suitable location where the driver of the vehicle can preferably see in his/her peripheral vision. In a preferred embodiment, both of the left and right A-pillars of the vehicle include a visual indicator assembly 20 which can be controlled separately by the controller 12. For example, the left side visual indicator assembly 20 can be used to convey information pertaining to the left side of the vehicle, and the right side visual indicator assembly 20 can be used to convey information pertaining to the right side of the vehicle.

As shown in FIG. 2, the visual indicator assembly 20 includes a plurality of light emitters 20a through 20f. Although the emitters 20a-f are shown mounted in linear manner having a length L, it should be understood that the plurality of emitters can be mounted in any manner or arrangement. As indicated above, the visual indicator assembly 20 delivers external sensor data to the driver based on certain conditions. As will be discussed in more detail below, the external sensor data corresponding to the vehicular condition can include blind spot detection, impact detection, lane changing detection, vehicle performance, temperature indication, reverse sensing, and/or right angle sensing. Preferably, the visual indicator assembly 20 delivers information about the sensor data more than a mere "on/off" or light on/light off indication. Thus, the visual indicator assembly 20 preferably includes a plurality of lights which may be controlled in an asymmetrical or gradient manner to thereby relate various degrees or different intensities of the external sensor data. The light display in the visual indicator assembly 20 can be controllable to emit different colors, intensities, frequency of blinking rates, blinking patterns, or number of lights emitted. For example, if the visual indicator assembly 20 were used for detecting engine temperature, the indicator could use a spectrum of colors to designate the temperature. Thus, a normally operating engine could be designated by emitting a blue or green color, a slightly overheated engine could be one or two orange or red lights, and a severely overheated engine could be designated by multiple blinking or high intensity red lights.

As another example, the visual indicator assembly 20 could alter the number of activated light emitters 20a-f to convey the severity of the condition. For example, if a condition is deemed severe, a large number of light emitter, such as 20a through 20f can be actuated. Less severe conditions can be conveyed by actuating a fewer number of light emitters, such as 20a and/or 20b. Thus, the emitters can be actuated in a gradient manner, for example, to actuate emitter 20a only for the least severe condition, actuate emitters 20a, 20b, and 20c for intermediate sever conditions, and all of the emitters 20a-f for the most severe condition.

Although the preferred embodiment of the indicator is mounted in the A-pillar, it should be understood that the indicator can be mounted at any suitable location within or outside of the normal view of the driver. For example, the indicator could be mounted on the roof, overhead rail, overhead console, in the instrument panel, on the steering wheel, or as a head-up projection on the windscreen.

Figure 3:
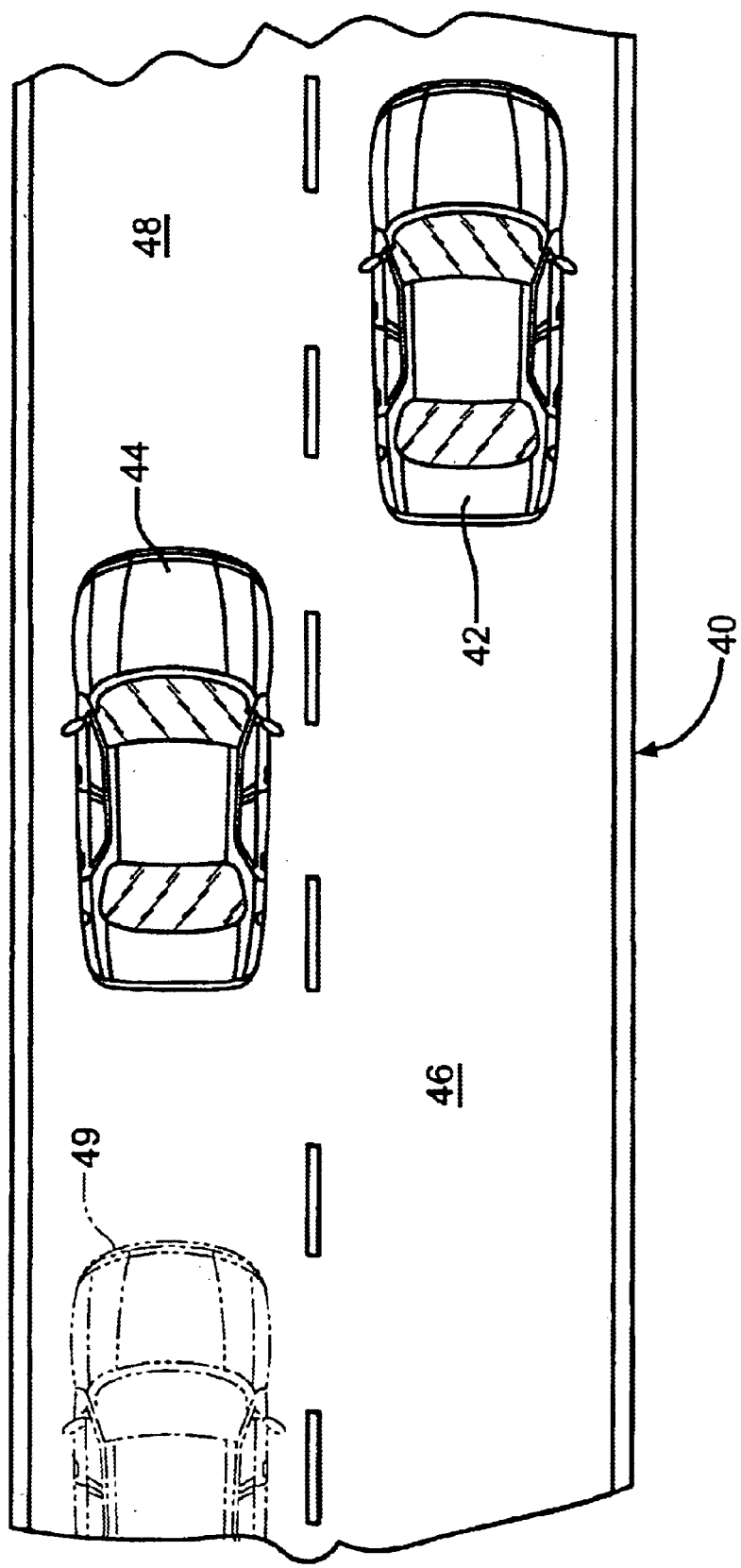
FIG. 3 a schematic plan view of a vehicle in which the visual display system is installed and the surrounding roadway illustrating a proximity system for use with the visual display system.

The visual indicator assemblies 14 and 20 can be also be used with proximity sensors used to relate information to the driver relating to the presence of another vehicle being in the "blind spot" when the driver intends to change lanes. Referring now to FIG. 3, a roadway indicated generally at 40 is illustrated with a main vehicle 42 installed with the visual display system 10 of the present invention. A second vehicle 44 is also traveling thereon. The main vehicle 42 can change lanes by moving from a first, driving lane 46 to a second, target lane 48. However, when changing lanes during driving, there often are other vehicles, such as the vehicle 44 in the target lane 48 into which the driver intends to enter. Ideally, when a driver activates a turn signal by means of a conventional turn stalk switch 45 shown in FIG. 2, to indicate a lane change, the driver also verifies that a target area in the target lane 48 directly to the side and/or rear of the main vehicle 42 is clear of other traffic. This target area is generally defined as the continuously moving space about the periphery of the main vehicle 42 into which the main vehicle 42 would move upon completing a lane change. The target area is often in the blind spot of the driver. The target area can be any size such as the same general size of the main vehicle 42 or preferably even larger extending rearwardly. The target lane 48 is the lane into which the main vehicle 42 intends to move. The amount of area within the target lane 48 that is detected by the sensors varies with the number, position and actuation of the sensors on the vehicle 42. In order to prevent accidents and increase safety, it would be advantageous to have the visual indicator assembly 20 display information indicating to the driver when a second vehicle 44 is occupying the target area. In order to determine whether a second vehicle 44 occupies the target area, the vehicle 42 can include various sensors (not shown) mounted on the vehicle 42 to detect the presence of another vehicle 44 or other obstructions in the target lane 48. The sensors 16 can include one or more sensors to detect an obstruction in the "blind spot" of a driver, and the front, rear and/or side of the vehicle 42.

It is preferred that the sensors are able to determine whether the object detected is a vehicle. The lane change sensors could detect when the vehicle 42 moves outside of certain roadway markings. To determine whether a vehicle is in the target area, the sensors are adapted to sense conditions that are predictive of a vehicle 44 approaching or in the target area. In a preferred embodiment, the sensors are proximity sensors which are adapted to sense the position and/or movement of a second vehicle 44 relative to the main vehicle 42. The sensed movement may be used to determine the velocity and/or acceleration of the second vehicle 44 relative to the first vehicle 42. Preferably, the sensors are adapted to sense position and movement of a plurality of vehicles in the vicinity of the main vehicle 42. The sensors can be any suitable proximity sensor for detecting the presence of the vehicle 44. For example, the sensors may include a transceiver for transmitting electromagnetic waves and receive feedback from the waves to sense surrounding vehicles. Suitable waves include microwaves, infrared waves, ultrasound waves, radio waves, electromagnetic waves, laser beams, and others.

The controller 12 is adapted to receive the signals generated by the sensors 16. The controller 12 can perform the predictive function in any suitable manner. Preferably, the controller uses an algorithm which is adapted to predict the position of the second vehicle 44 based on the sensed conditions, such as the sensed position and movement of the second vehicle 44. In the illustrated embodiment, the controller 12 generates first and second signals representative of the predicted motion of the second vehicle 44.

Upon detection by one or more of the sensors that a second vehicle 44 is either in the target lane 28 or the target area, the controller will actuate the visual indicator assembly 20 to alert the driver to the presence of the second vehicle 44 in the target lane 48. In a preferred embodiment, when the driver engages the turn stalk 45 from a neutral position to a left or right indicator position, the controller 12 actuates the sensors 16 to detect the area surrounding the vehicle 42. It is preferred that the sensors provide feedback anytime the turn stalk is moved out of the neutral position. If the sensors do not detect a vehicle 44 in the target area, as described above, then the turning signal operates in a typical manner, and the visual indicator assembly 20 may not be actuated by the controller 12. The visual indicator assembly 20 could be actuated to indicate the absence of a vehicle, for example by emitting a green color. If a vehicle 44 is detected when the driver actuates the turn stalk 45, then the controller 12 actuates the visual indicator assembly 20 to alert the driver of this condition.

Preferably, the visual indicator assembly 20 changes with respect to the impending closeness of the vehicle in the target area. For example, a "strong" signal can be displayed as a vehicle moves closer to the driver's blind spot or anywhere near the target area of the target lane 48, for example the position of the vehicle 44 shown in solid lines in FIG. 3. Additionally, the visual indicator assembly 20 can be actuated if a distant second vehicle, indicated by broken lines 49, is in the target lane 48 and is approaching the main vehicle 42 at a high rate of speed. The visual indicator assembly 20 can communicate the relative velocity of an approaching vehicle that is not currently in the driver's blind spot, by actuating at least one emitter at a first lighting characteristic and a second emitter at a second lighting characteristic, as described above. It is preferred that the display becomes "stronger" or "milder" according to the potential danger of a vehicle in or approaching the target area in the target lane 48. Specifically, if the sensors 16 detect a vehicle in the target area, the controller 12 would actuate the visual indicator assembly 20 to its strongest display. Also, a vehicle that is not in the target area, but is in the target lane 48 that is approaching at a high rate of speed would trigger a strong display. Oppositely, a vehicle 49 that is in the target lane 88, but is a safe distance away or is moving at a slower or equal speed, could trigger a mild display or no display. Examples of a strong display include high light intensity, relatively large number of lights, a high blinking rate or intense blinking pattern, emission of colors generally indicative of dangerous conditions (such as red). Examples of mild displays include no light display, few number of lights, or emission of colors generally not indicative of safeness (such as green).

Although FIG. 2 is illustrated as a left lane change or left turn, it should be appreciated that the present invention can also be applied for use with right lane changes and right turns.

Another condition in which the visual indicator assembly 14 or 20 can deliver information to the driver is a backup or rear proximity condition. A proximity sensor is used to detect the presence of an object behind the vehicle when the vehicle is in reverse. The indicator can change from a mild to a strong signal depending on the proximity of the object.

The visual indicator assembly 14 or 20 can also be used for a lane minder condition in which a sensor senses the position of the vehicle relative to the lane lines of a road. If the vehicle swerves too far and begins to cross or crosses a line, the indicator will alert the driver. Preferably, the left or right visual indicator assembly corresponding to the direction of the vehicle will be displayed. Thus, if the vehicle veers to the right crossing the line, the right indicator displays.

The visual indicator assembly 14 or 20 can also be used to alert the driver to right angle proximity warnings. For example, in pulling out of a parking spot, it may be difficult to see traffic coming from the traffic lane (in a direction normal to the vehicle). Sensors mounted on the left and right front and/or rear of the vehicle sense the proximity of vehicles in a direction generally normal to the vehicle. If the sensor and controller detects the presence of a vehicle, the indicator displays a visual identifier, such as those described above.

The indicator can also be used to deliver visual information on conditions other than proximity conditions. For example, the indicator can be used with telematic devices, such as cell phones, data modules, RF and satellite radios to display warnings or to simply notify the driver of an incoming message. The indicator can also be used with navigation equipment (GPS), directional equipment, or distance-to-target equipment. For example, when hooked up with a GPS navigation device, the left or right visual indicator assembly 14 or 20 can flash corresponding to when the driver should turn. The colors, intensities, blinking rates, and/or blinking patterns can change depending on the closeness of the turn. The indicator can also be used to display vehicle conditions, such as temperature, HVAC controls, and warning lights.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A visual display system for a vehicle comprising:
- a trim panel adapted to be mounted on an A-pillar of the vehicle;
- a visual indicator mounted on said trim panel and having a plurality of light emitters positioned in a linear arrangement on said trim panel;
- a controller connected to said visual indicator; and
- a device for detecting a vehicular condition and capable of transmitting a signal to said controller in response to the vehicular condition, such that said controller is operable to actuate said plurality of light emitters in differing lighting characteristics in a gradient manner in response to the signal.

2. The system of claim 1 wherein said device is a proximity sensor.

3. The system of claim 2, wherein said proximity sensor is capable of detecting the presence of a vehicle in a driver blind spot.

4. The system of claim 2, wherein said proximity sensor is adapted to detect the presence of a second vehicle in a predetermined region relative to the vehicle in which said visual display system is mounted, and wherein the presence of the second vehicle is the vehicular condition.

5. The system of claim 4 further including a turn signal switch, said turn signal switch movable to a position indicating the driver's intent to turn the vehicle in a first direction, wherein said turn signal switch is connected to said controller and capable of transmitting a signal to said controller corresponding to the driver's intent.

6. The system of claim 1, wherein said device is a temperature sensor.

7. The system of claim 1, wherein said device is a sensor for detecting the operational state of an electronic device.

8. The system of claim 1, wherein said lighting characteristics include the color of the light emitted by said emitters.

9. The system of claim 1, wherein said lighting characteristics include the intensity of the light emitted by said emitters.

10. The system of claim 1, wherein said lighting characteristics include the frequency of a blinking rate of the light emitted by said emitters.

11. The system of claim 1, wherein said lighting characteristics include the number of emitters actuated.

12. The system of claim 1, wherein said lighting characteristics include the pattern of said emitters actuated.

* * * * *